Aug. 9, 1932.  R. SAVY  1,871,346
APPARATUS FOR COOLING MOLDED CONFECTIONS
Filed April 22, 1931   2 Sheets-Sheet 1
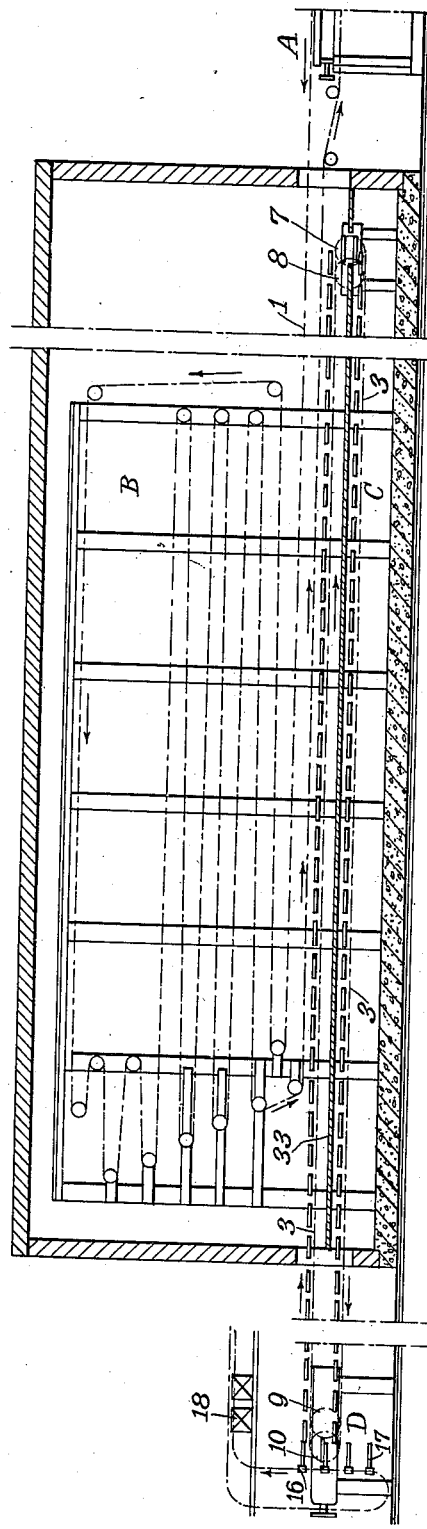
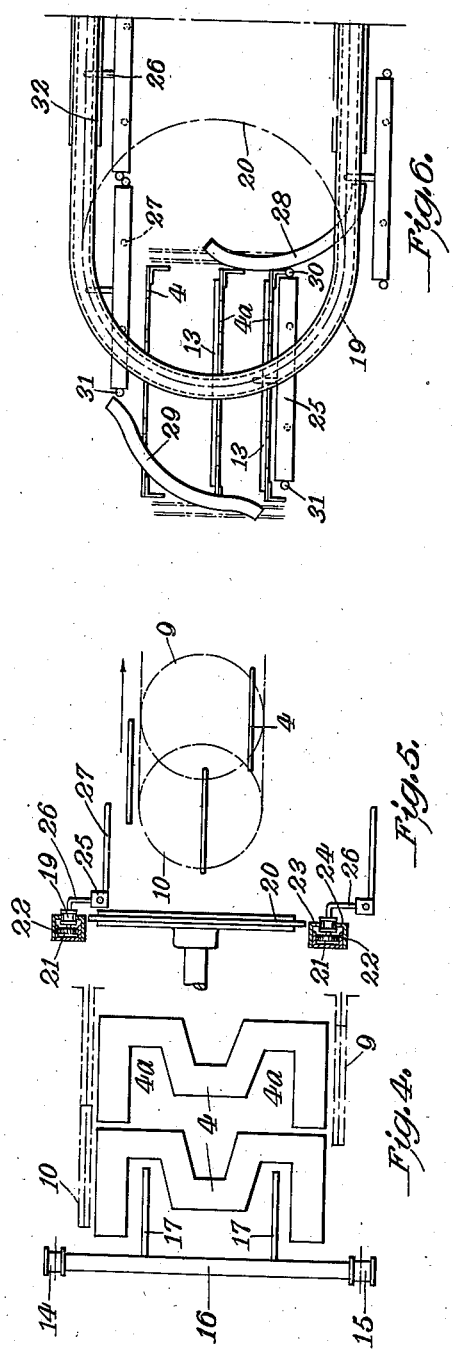
INVENTOR
ROBERT SAVY
BY George B. Willcox
ATTORNEY

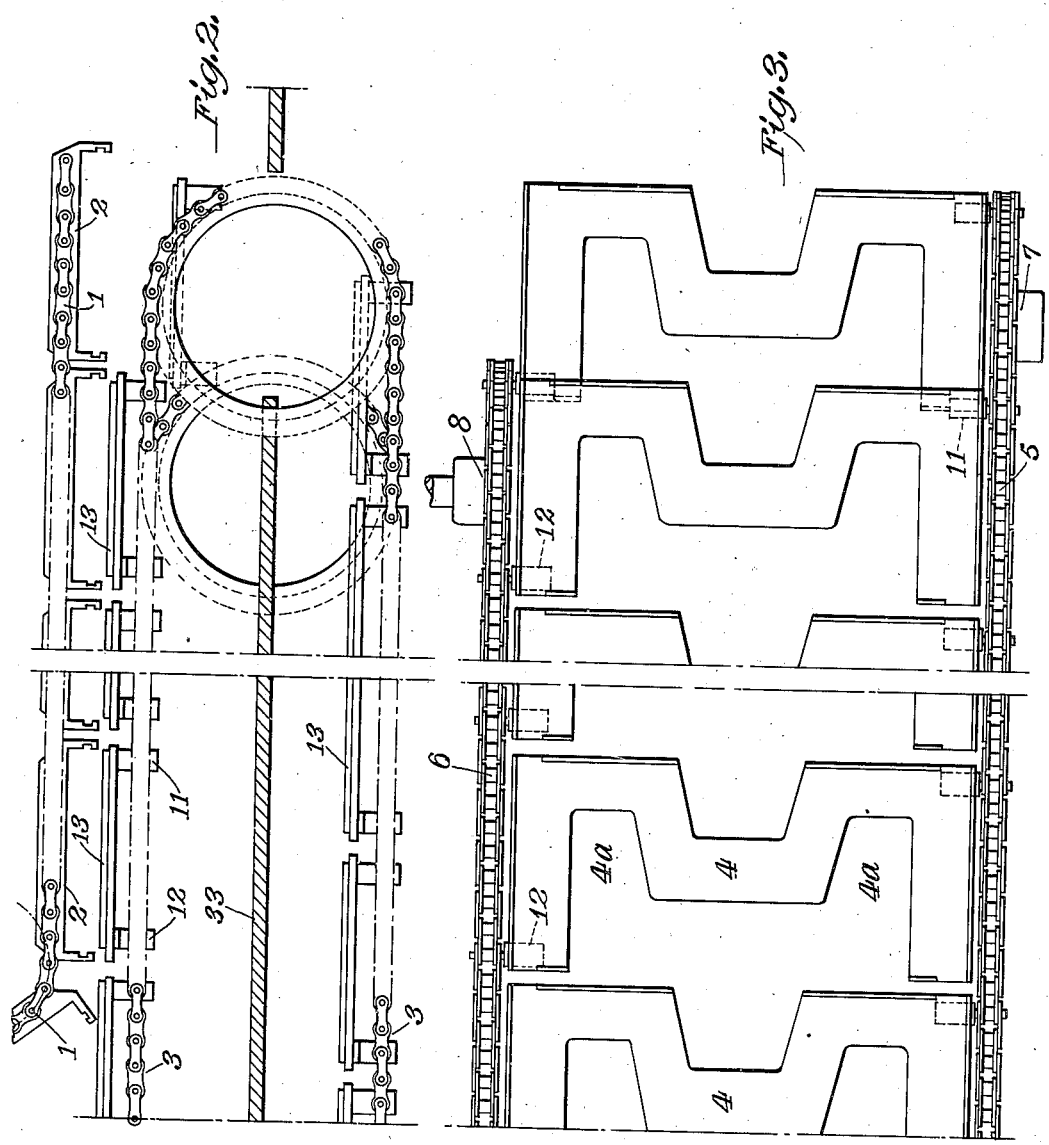

Patented Aug. 9, 1932

1,871,346

UNITED STATES PATENT OFFICE

ROBERT SAVY, OF PARIS, FRANCE, ASSIGNOR TO BAKER PERKINS COMPANY, INC., OF SAGINAW, MICHIGAN, A CORPORATION OF NEW YORK

APPARATUS FOR COOLING MOLDED CONFECTIONS

Application filed April 22, 1931, Serial No. 531,921, and in France May 17, 1930.

This invention relates to high capacity machines for continuously molding materials, carrying the material in the molds on an endless conveyor through a cooling chamber, and then transferring said material from the mold onto a second conveyor which carries the cooled, solidified material to a point outside of the cooling chamber.

It relates more particularly to an improved arrangement of the conveyors whereby the delicate molded articles, such as chocolate bars, are transferred from one conveyor to the other with a minimum of shock, and possible defacement by falling upon one another is avoided.

In machines previously constructed the molds are conveyed on an endless chain conveyor past the filling machine, then into a large cooling chamber in which they are carried through a circuitous path, finally traveling immediately below and in a direction opposite to the conveyor run on which they entered. This bottom run, both in the old machine and in the new machine, is arranged with suitable co-acting mechanism for inverting the molds and discharging their contents, the cooled solidified bars, onto a second conveyor for carrying them out of the cooling chamber to the unloading station.

Heretofore simple belt or tray conveyors have been used to receive the goods discharged from the first cooling conveyor. Such a transfer conveyor, having only its top run for a working run, necessarily has been driven in the opposite direction to the discharging run of the cooling conveyor, in order that the wrapping station might be located at the opposite end of the cooling chamber from the molding apparatus. In this latter construction the relative movement between the cooling and discharging conveyor was necessarily rather rapid, and since the articles were discharged from the molds by gravity, and since by reason of their various degrees of adhesion to the molds they could not be discharged at exactly predetermined moments, it followed that they fell onto the second conveyor at random, frequently on top of each other, thus causing the confections to be marked and defective.

Furthermore, these articles were carried by the second conveyor out of the cold atmosphere of the cooling chamber directly into the warm air of the work-room. Such a sudden change in temperature has various undesirable effects on the goods. For example, if the humidity of the air in the work room is great, moisture condenses on the cold surfaces of the chocolate bars.

One object of my invention is to provide a different type of transfer conveyor for receiving the goods and carrying them out of the cooling chamber, old in itself, but new in its application to a cooling machine of this type. This improved conveyor has its top run traveling in the same direction and at the same speed as the discharge run of the cooling conveyor, whereby the goods falling thereon may keep their original spacings and are not marred by striking either other pieces or the oppositely traveling edges of the receptacles carried on the transfer conveyor.

Further, I provide material-carrying members on the transfer conveyor which are arranged to travel around the guiding sprockets and through both the upper and lower runs with their faces maintained upright and horizontal at all times. Thus both runs are working runs, and goods can be removed from the lower run at the opposite end of the cooling chamber from that at which they enter it.

The second object of my invention is to provide a horizontal baffle or partition between the upper and lower runs of the transfer conveyor, which defines a second cooling compartment below the principal cooling chamber, which compartment can be maintained at a temperature intermediate that of the principal cooling chamber and that of the air in the work-room. By this means the goods can be subjected to a tempered atmosphere during their travel on the lower run of the conveyor and they can be brought gradually to approximately the temperature of the outside air, avoiding the bad effects of suddenly introducing them when cool into the warmer air of the work room.

Other advantages characteristic of the invention will be found in the description which follows:

Referring to the drawings, Fig. 1 is a diagrammatic sectional side elevation of the complete working arrangement of the conveyors and the cooling compartments, showing their relation to the molding and unloading stations.

Fig. 2 is a side elevation of my improved transfer conveyor, taken at a point of transfer of the goods from the cooling conveyor to this conveyor.

Fig. 3 is a plan view of the conveyor shown in Fig. 2.

Fig. 4 is a diagrammatic view showing one means for automatically removing the trays of cooled confections from the transfer conveyor.

Fig. 5 is a diagrammatic side elevation of the discharge end of the transfer conveyor, showing another arrangement of means for automatically removing the trays from the transfer conveyor.

Fig. 6 is an end view of the conveyor and molding mechanism shown in Fig. 5.

I will now describe a preferred form of my invention, as adapted to the manufacture of chocolate bars. Referring to Fig. 1, an endless chain conveyor 1 of any suitable known type carries the molds 2 from the mold-filling station A, enters the cooling chamber B, and travels in the paths indicated by the arrows in a circuitous path through this chamber, its final run passing below the other runs and out of the chamber back to station A. The molds 2 are held upright by known means during their travel through all but the final conveyor run within the cooling chamber B. When they reach this final run of the conveyor 1 they are inverted and the cooled goods are discharged from them onto the improved conveyor which will now be described. The arrangement of the cooling conveyor illustrated in Fig. 1 and described above is exactly the same as has been employed heretofore.

This second conveyor 3, called hereafter the transfer conveyor, travels, as indicated by the arrows in Fig. 1 and at the same speed as the cooling conveyor. Its upper run travels as close as possible to the discharging run of the cooling conveyor and in the same direction. The transfer conveyor may be any one of various known forms.

The form which I prefer to employ is shown in detail in Figs. 2 and 3. Plates 4 are mounted between two parallel chains 5 and 6 passing at one end of the conveyor around driving sprockets 7 and 8 and at the other end around idler sprockets 9, 10. Each plate 4 is pivoted to the chains 5 and 6 by trunnions 11 and 12 located at diagonally opposite corners of the plates. These two trunnions are fixedly secured to the tray, are perpendicular to the chain, and each is connected coaxially to a roller of the chain on that side of the conveyor. The driving sprockets 7 and 8 are displaced from each other lengthwise of the conveyor a distance equal to the space between the trunnions 11, 12 on each plate 4, as shown in Figs. 2 and 3, so that the plate remains upright when traveling around the sprockets 7, 8. This applies also to the other sprockets 9, 10 at the other end of the conveyor, which can be seen in Fig. 1. Each conveyor plate 4 is shaped, as shown, with two deep recesses 4a cut in from one edge, and each plate is adapted to carry a tray 13 removably placed thereon. When the trays have been carried to the unloading station D they are automatically removed from the conveyor plate 4 by a mechanism to be described.

Fig. 4 shows diagrammatically the tray-lifting members of the unloading mechanism shown at station D in Fig. 1. This mechanism comprises a pair of vertically-traveling conveyor chains 14, 15 carrying spaced cross bars 16. Each cross bar is provided with a pair of outwardly projecting arms 17, which are adapted to pass through the recesses 4a in the conveyor plates 4. The conveyor chains 14 and 15 are driven at a rate of speed greater than the speed at which the conveyor plates 4 pass around the sprockets 9, 10. Thus the arms 17 pass through the gaps 4a in plate 4, pick up the trays 13 resting thereon, and carry them to a wrapping machine 18.

Figs. 5 and 6 show a variation of this mechanism, usable if it is desired to convey the trays from the unloading station D in a direction at right angles thereto to a wrapping station located on the same floor. This comprises a single chain 19 passing over a wheel 20. Chain 19 is provided with rollers 21 which travel on a track 22 and at the same time the rollers are held against lateral movement by guides 23, 24. Bars 25 parallel to chain 19 are secured thereto by brackets 26 pivotally mounted on the chain. Pan-engaging fingers 27, adapted to pass through apertures 4a of conveyor plates 4, are fixed at right angles to the bars 25. These pan-engaging fingers 27 are held horizontal by the guides 23 and 24 even when they are loaded with trays 13. To prevent bars 25 from oscillating as they pass around wheel 20, two guides 28 and 29 are located near the wheel, and co-acting rollers 30, 31 are fastened at the end of the bars. Referring to Fig. 6, as bar 25 is carried around wheel 20, roller 30 first runs on guide 28, when the fingers 27 pick up a tray 13 from the conveyor plate 4. When the bar travels around the upper part of the wheel 20, roller 31 travels on guide 29, thus maintaining the bar 25 and the plate 13 horizontal until the chain supporting the bar reaches the horizontal track 32 leading to the wrapping machine.

Referring again to Fig. 1, a horizontal baffle 33 is placed between the upper and lower runs of the transfer conveyor chains 5, 6 so that a second cooling compartment C is partitioned off from the upper chamber B. This compartment C is provided with means for maintaining its atmosphere at the proper temperature, one between that of cooling chamber B and that of the outside room. The goods on the lower run of the conveyor travel the full length of this compartment C and their temperature can be gradually brought approximately to that of the outside air.

The following advantages are derived from the improved arrangement and construction which has been above described:

In the first place the molded candy bars discharged from the molds in the bottom run of the cooling conveyor 1 fall on the trays 13 of the transfer conveyor in the same relative position as they occupied on conveyor 1, thus preventing their striking others already on the trays, and marring or breakage of the bars is avoided.

My use of a transfer conveyor having two active runs makes it possible to have the inverted trays in the bottom run of the cooling conveyor and the receiving trays 13 in the upper run of the transfer conveyor travel in the same direction and it makes it possible to subject the bars traveling in the lower run of the transfer conveyor to the tempering process already described.

The scope of my invention is not limited to the particular embodiment described above. For instance, if the automatic means for unloading the transfer conveyor is not employed, it is not necessary to have trays 5 removable from separate plates 4. In this case trays or other suitable containers permanently secured to the conveyor will replace plates 4, and goods thereon will be unloaded by hand at station D. Other changes in detail, as the substitution of trays for the molds of the cooling conveyor, can also be made in adapting the invention to various products, without departing from the spirit of my invention.

Having thus described my invention, what I claim and desire to secure by Letters Patent is:

1. In a machine for cooling molded material, in combination a cooling chamber, an endless conveyor for carrying containers for the material to be cooled entering said chamber at one end and traveling in a circuitous path therethrough, the bottom run of said conveyor arranged to invert and empty said containers, said conveyor leaving the chamber at the same end at which it enters, a second cooling chamber below said first mentioned chamber, a horizontal baffle separating said chambers, an endless transfer conveyor for receiving material discharged from said first conveyor, said transfer conveyor having two laps and arranged to carry trays and maintain them upright on both laps, the upper lap traveling above said baffle, closely beneath, at the same speed, and in the same direction as said lower run of the first-mentioned conveyor, the lower lap of said transfer conveyor traveling beneath said baffle to carry the material thereon out of said second cooling chamber to an unloading station.

2. In a machine for cooling molded material, in combination, a cooling chamber, an endless conveyor for carrying containers for the material to be cooled entering said chamber at one end and traveling in a circuitous path therethrough, the bottom run of said conveyor arranged to invert and empty said containers, said conveyor leaving said chamber at the same end at which it enters, an endless transfer conveyor for receiving material discharged from said first conveyor, said transfer conveyor having two laps and arranged to carry trays upright on both laps, the upper lap of said transfer conveyor traveling closely beneath, at the same speed, and in the same direction as said lower run of the first-mentioned conveyer, the lower lap of said transfer conveyor traveling out of said cooling chamber to an unloading station.

In testimony whereof I affix my signature.

ROBERT SAVY.